Dec. 26, 1967 C. F. FORSLUND 3,359,895

PIVOTAL SCREEN PRINTING APPARATUS

Filed Feb. 15, 1965 11 Sheets-Sheet 1

INVENTOR.
Charles F. Forslund
BY
Manfred M. Warren
His Attorney

INVENTOR.
Charles F. Forslund
BY Manfred M. Warren
His Attorney

INVENTOR.
Charles F. Forslund
BY Manfred M. Warren
His Attorney

INVENTOR.
Charles F. Forslund
BY
His Attorney

INVENTOR.
Charles F. Forslund
BY Manfred M. Warren
His Attorney

INVENTOR.
Charles F. Forslund

BY Manfred M. Warren
His Attorney

INVENTOR.
Charles F. Forslund
BY
Manfred M. Warren
His Attorney

PIVOTAL SCREEN PRINTING APPARATUS

Filed Feb. 15, 1965 11 Sheets-Sheet 8

INVENTOR.
Charles F. Forslund
BY Manfred M. Warren
His Attorney

INVENTOR.
Charles F. Forslund
BY Manfred M. Warren
His Attorney

INVENTOR.
Charles F. Forslund
BY
Manfred M. Warren
Attorney

INVENTOR.
Charles F. Forslund
BY
Manfred M. Warren
His Attorney

United States Patent Office 3,359,895

Patented Dec. 26, 1967

3,359,895

PIVOTAL SCREEN PRINTING APPARATUS

Charles F. Forslund, 3510 Rubin Drive, Oakland, Calif. 94602

Filed Feb. 15, 1965, Ser. No. 432,528
2 Claims. (Cl. 101—123)

The invention relates to screen printers and particularly to automatic printers capable of printing circuit boards and other objects where high fidelity, accuracy and close printing tolerances are required.

An object of the present invention is to provide a printer which will provide a more precision control of all of the printing parameters and automatically print a series of parts, and maintain registration with each successive part within extremely close printing tolerances.

Another object of the present invention is to provide a printer which is programmed to obtain high quality volume production with efficient and minimum movement of the working parts.

Still another object of the present invention is to provide a printer in which the base is constructed from a minimum number of extremely rugged parts and a minimum number of controls which may be manipulated to easily and quickly bring the base into registration with the stencil of the printing screen.

A further object is to provide easy, rapid and rigid frame mounting.

A still further object of the present invention is to provide a printer which has accurate and flexible adjustments to accommodate operators utilizing varying printing techniques and to use various types of ink for printing on various types of parts.

Another object of the present invention is to provide a basic printer which may be readily modified to accommodate screens of varying size.

The invention possesses other objects and features of advantage, which will be set forth in the following description and drawings of the preferred form of the invention. It is to be understood, however, that variations in the description and examples may be adopted within the scope of the invention as set forth in the claims.

Referring to the drawings.

Figure 11:
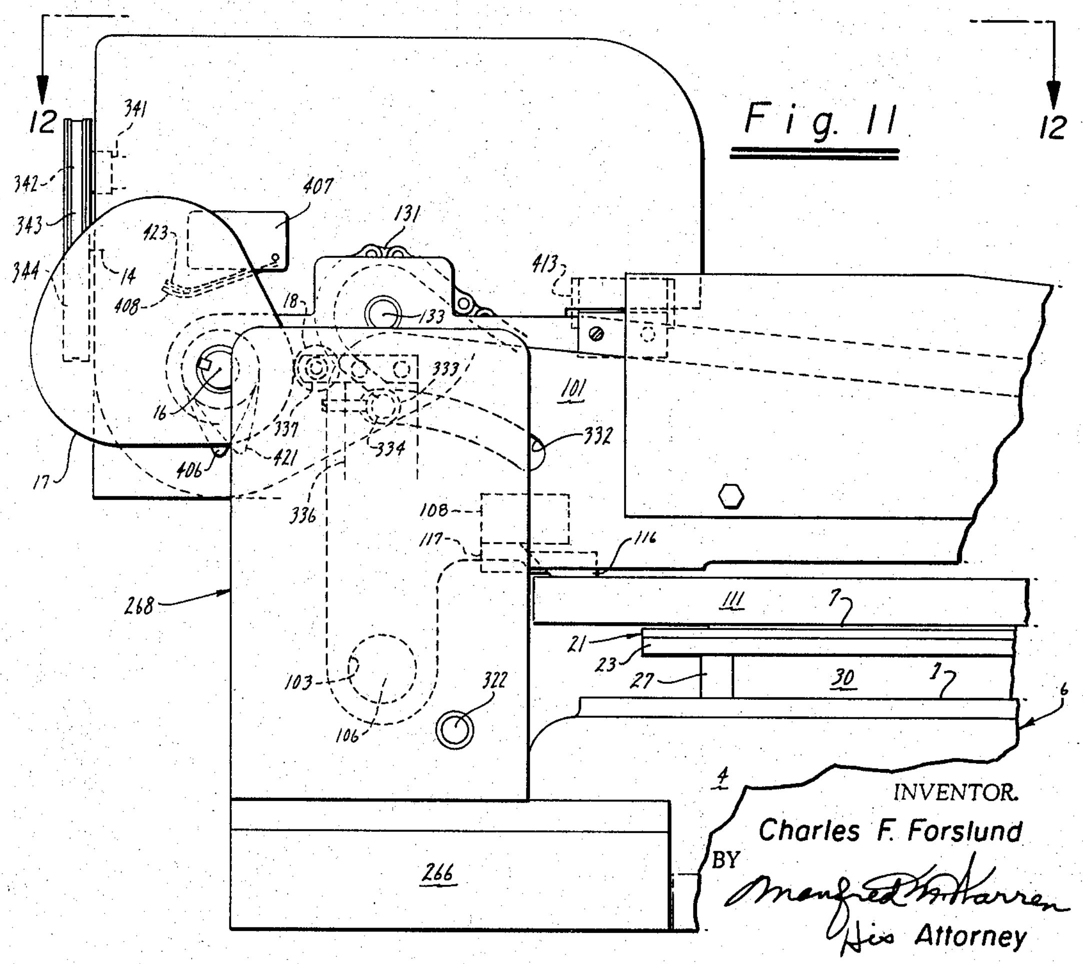
FIGURE 11 is an end elevation of a portion of the device taken substantially along the line 11—11 of FIGURE 2 and shown on an enlarged scale.
Figure 13:
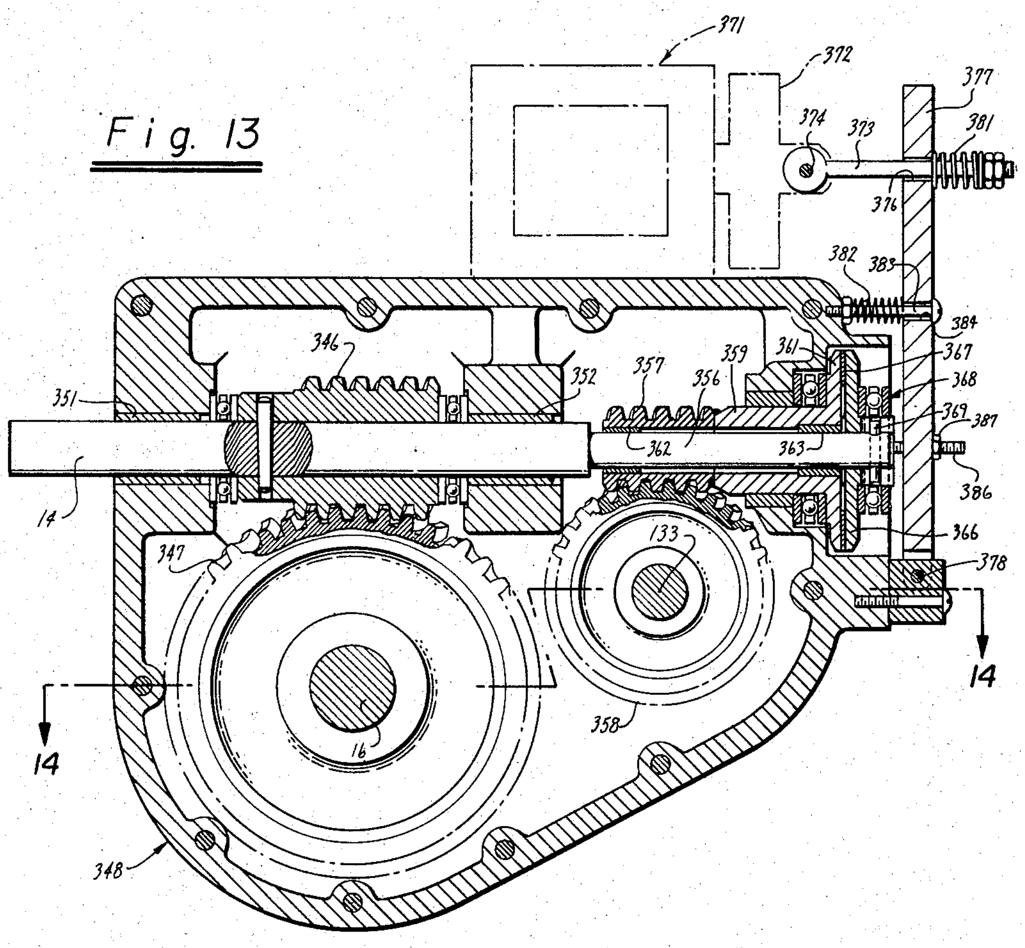
FIGURE 13 is a cross-section of a portion of the device taken substantially along the line 13—13 as shown in FIGURE 2 and shown on an enlarged scale.
Figure 14:
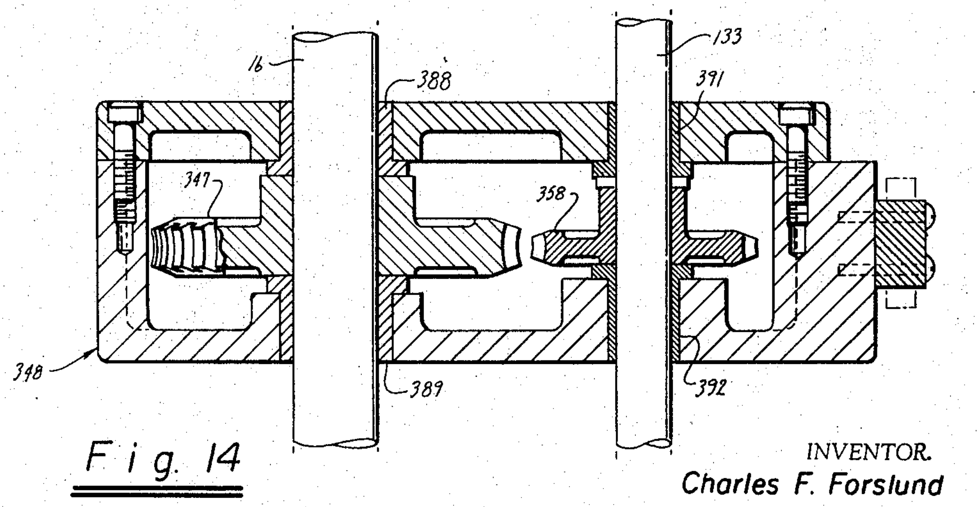
FIGURE 14 is a cross-section of a portion of the device taken substantially along the line 14—14 of FIGURE 13.

The printing device of the present invention consists briefly of a base 6 adapted for receiving a part 7 to be printed, a printing head 8 adapted for receiving a screen 9 and pivotally mounted on the base for movement between a lowered operative printing position in registration with the base and an elevated inoperative position, continuous loop means 11 (see FIGURE 7) mounted on the head having spaced first and second tracks, squeegee means 12 mounted on the head for movement across the head and being connected to the loop means for controlled repetitive printing strokes and return strokes, motor means 13, a drive shaft 14 connected to the motor, a driven shaft 16 (see FIGURES 2, 7, 11 and 13) mounted for rotation on the head and connected to the drive shaft, a cam 17 (see FIGURES 2 and 11) mounted on the driven shaft 16 for rotation therewith, a cam follower 18 mounted on the base and positioned so as to react with the cam for moving the head to operative position during the squeegee printing stroke and to inoperative position during the return stroke, and gear means connecting the drive shaft and the continuous loop means for driving the squeegee.

A primary feature of the present invention is the ease and speed with which the part to be printed can be brought into precise registration with the stencil on the screen. Precision of registration is required in numerous types of printing, such as multi-color printing, electrical circuitry printing and particularly where the boards are printed on both sides and are electrically connected by coated performations through the board. In the present machine, 0.001 inch repeatability is obtainable on the $x$ and $y$ axis. The printed areas around the perforations, known as "pads" must be accurately aligned in surrounding relation to the perforation.

Figure 3:
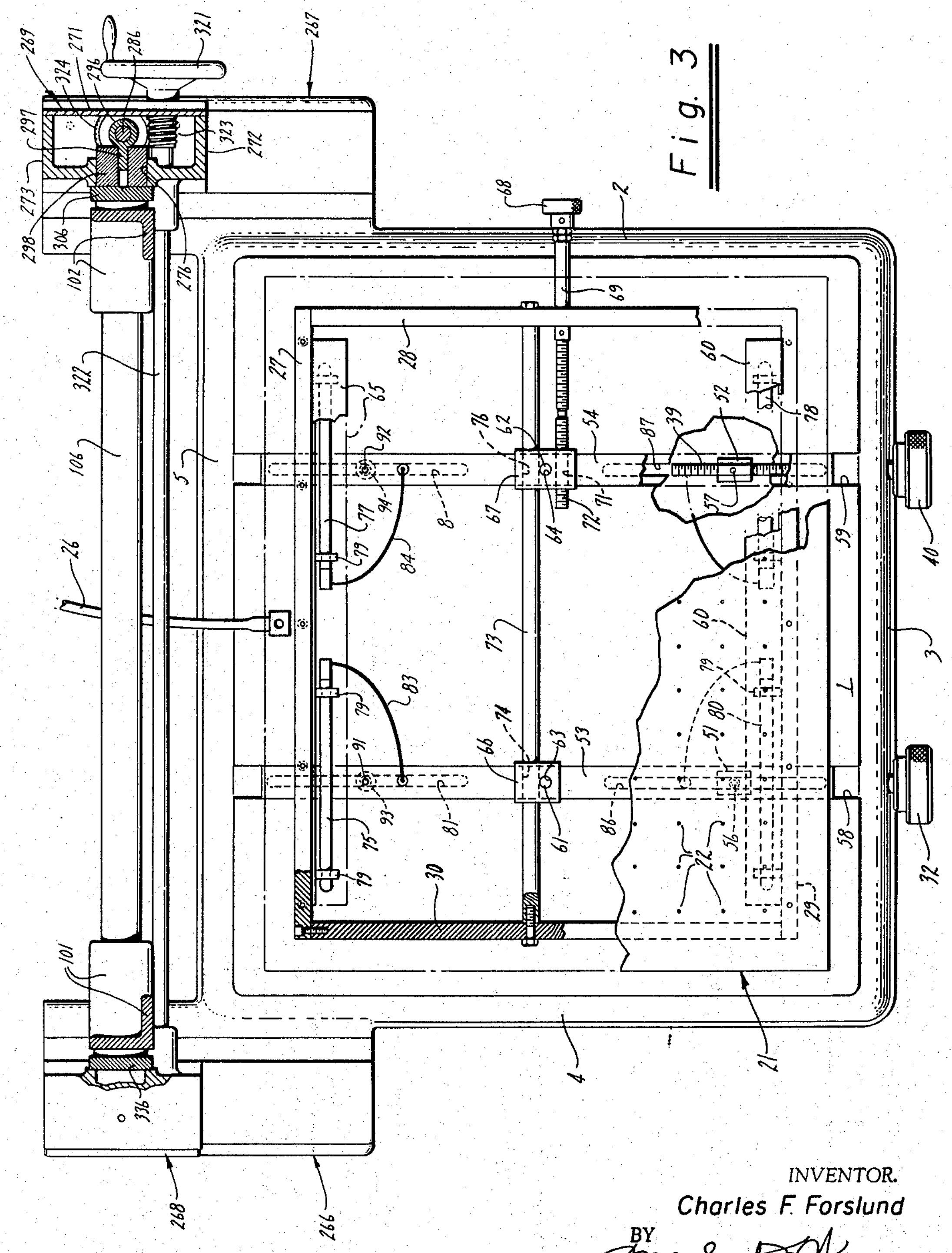
FIGURE 3 is a plan view of the device taken substantially along the plane as indicated by line 3—3 of FIGURE 1 with parts partially broken away for purposes of clarity.

The base is constructed of heavy, accurately machined castings and includes a sub-base 21 which is preferably made of ground aluminum plate and is mounted on the base for controlled side to side fore and aft, and rotational movement in a plane for registration with a stencil on the screen when the head is in the operative position. Such displacement of the sub-base is effected by first manual control means connecting the sub-base and the base for movement of the sub-base along a first axis of the plane, and second manual control means connecting the sub-base and the base for movement along a second axis at substantial right angles to the first axis. Base 6 is formed with a smooth surface 1 supported by upstanding legs 2, 3, 4 and 5. The sub-base may also be made from translucent material such as a plastic. Either the metal or the plastic may be perforated as shown by pin holes 22, see FIGURE 3. When the sub-base is perforated, a member 23, formed with a chamber 24 is placed in sealing engagement with the sub-base 21 and attached to a vacuum line 26 for inducing a vacuum in the chamber and holding the part to be printed in close relationship with the sub-base. Supporting the sub-base is a floating frame member consisting of sides 27, 28, 29 and 30.

Movement of the sub-base is effected by providing a pair of manually operable first screw members. One of the members consists of a hand knob 32 connected to a shaft 33 journaled for rotation in a bearing 34 and a sprocket wheel 36 mounted for rotation on the shaft. One end of the member is formed with a threaded portion 37. The other screw member consists of a hand operable knob 40 mounted for rotation on a shaft 38 having a threaded portion 39 journaled for rotation on the base by bearing member 41. A clutch means is associated with one of the knobs and here consists of a flange 43 providing a friction plate surface and having an elongated sleeve 44 for sliding engagement on the shaft 38. Sprocket 46 is mounted for rotation on the sleeve. A friction washer 47 provides a slipping plane between flange 43 and a slip face of the sprocket wheel. The sprocket wheel is biased against the friction washer by means of a spring 48 bearing against a lock washer 49 mounted on sleeve 44. A link chain 50 mounted on the sprocket wheels interconnects the manual screw members so that rotation of one turns the other, the interposition of the clutch means makes it possible for one member to be rotated while the other is stopped, or rotated at different speeds or they may even be rotated in different directions.

Rotational motion of the manual knobs is translated to the sub-base by means of nut members 51 and 52 joined to a pair of slide members 53 and 54 by machine screws 56 and 57. The slide members are confined in channel groves 58 and 59.

The slide members are connected to the floating frame of the sub-base by means of connecting pins 61 and 62 which interfit with openings 63 and 64 in block members 66 and 67 for pivotal rotation thus movement of either knob 32 or 40 moves the sub-base along a first axis.

Movement along a second axis at right angles to the first axis is accomplished by means of turning a second manual screw member consisting of a shaft 69 mounted for rotation on the base at approximately right angles to the first pair of screw members, and having a threaded portion 72 and a manual operable knob 68.

Block member 67 is formed with a threaded bore 71 formed for threadable engagement with the threaded portion of shaft 69. Movement of the sub-base may be confined to a motion along the second axis by means of an elongated member 73 formed for receipt in bores 74 and 76 of the block members.

Figure 4:
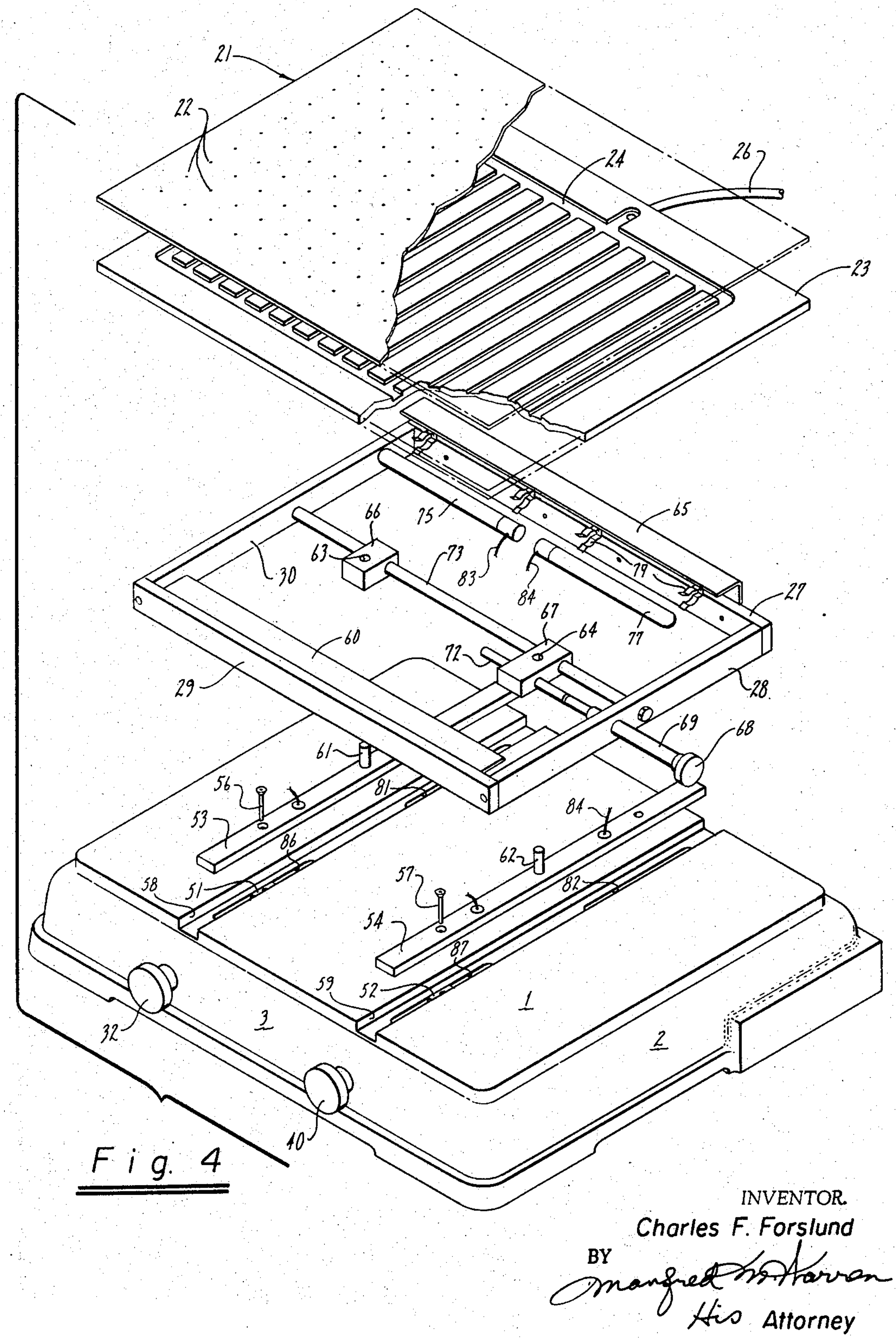
FIGURE 4 is an exploded view of a portion of the device.
Figure 5:
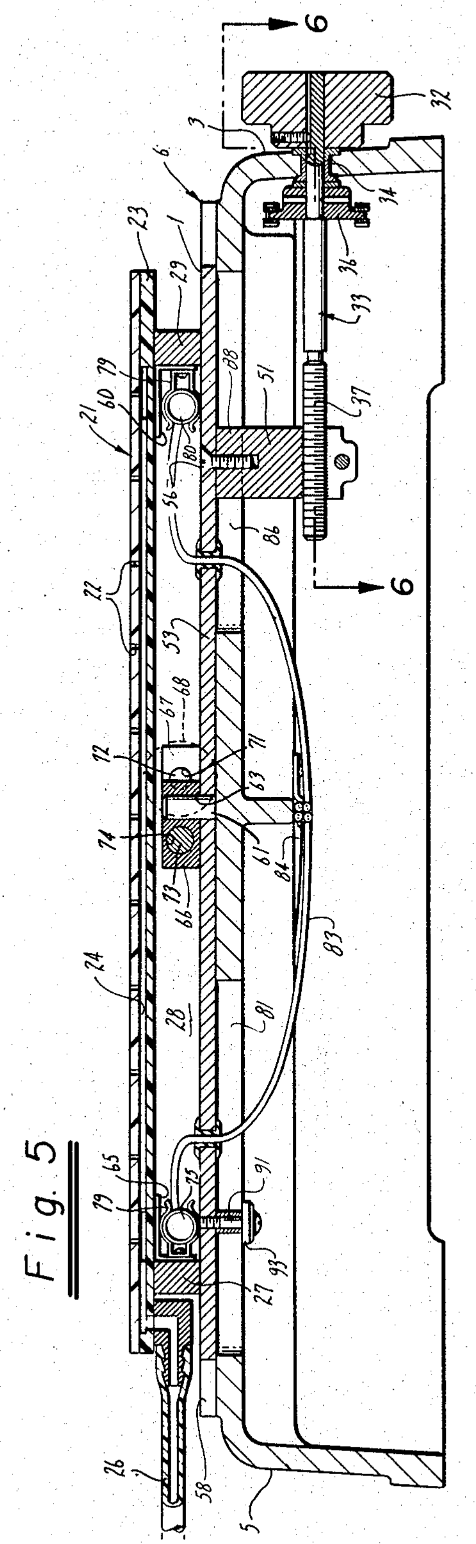
FIGURE5 is a cross-section of the device taken substantially along the line 5—5 of FIGURE 3 shown on an enlarged scale.
Figure 6:
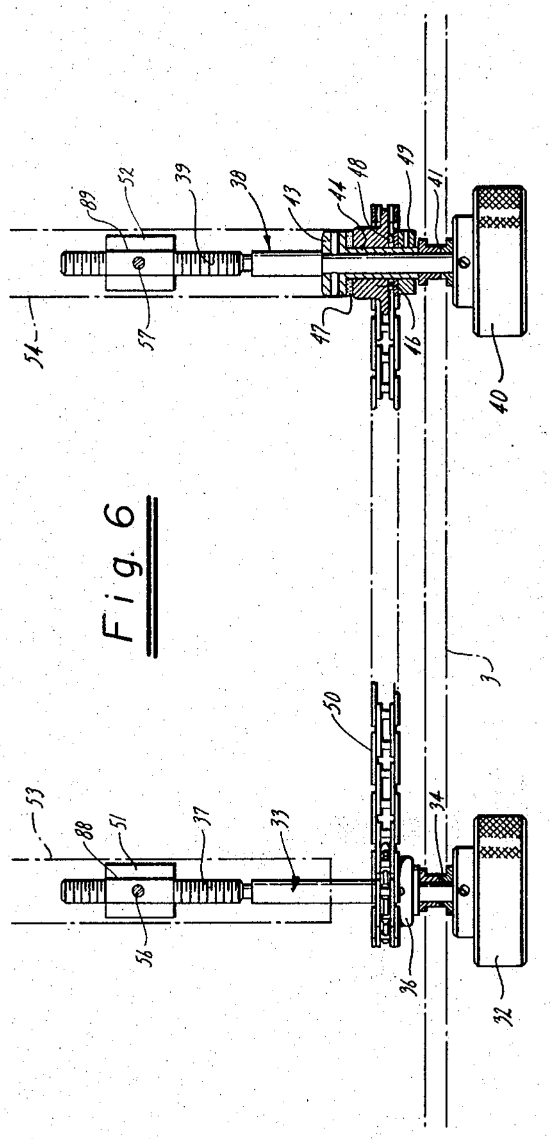
FIGURE 6 is a partial cross-section of a portion of the device taken substantially along the line 6—6 of FIGURE 5.

The unique arrangement of the parts above described makes it possible to pivot the sub-base by simply rotating the knobs 32 and 40 at different speeds or in different directions. Rotating knob 40 for example, and holding knob 32 immovable causes the sub-base to pivot about pin 61. Turning both knobs 32 and 40 at the same rate of speed, however, causes the plate to rotate at a pivot point somewhere between pins 61 and 62. Turning knobs 32 and 40 at different rates of speed in the same direction causes the sub-base to move in an axial direction and also to turn at the same time about a continually changing pivot point. Rotating the knobs in different directions and at different rates causes the sub-base to rotate more rapidly about a changing pivot point. In like manner, knob 40 may be fixed and knob 32 rotated so that the sub-base pivots about pin 62. By rotating knob 32 at a faster rate of speed than knob 40, the sub-base pivots about a point projected toward the right of the base as shown in FIGURE 4. Thus, by varying the controls of the two knobs the base rotates about various pivot points. The sub-base here described has a lateral movement of about 2 inches and a front to back movement of about 2 inches. The slewing angle is about 20°.

Where the sub-base is formed with a translucent sheet 21, it is sometimes desirable to light the underside of the sub-base and for this purpose light bulbs 75, 77, 78 and 80 may be attached to the sub-base by brackets 79 and the light diffused by bafflers 60 and 65. The base member is provided with slots 81 and 82 to permit the insertion of electric cords 83 and 84 to pass therethrough. The base is also formed with slots 86 and 87 to permit connection of the nut members 51 and 52 to the slide members 53 and 54. It should be noted that the nut members are formed with projections 88 and 89 formed for sliding receipt in the slot members 86 and 87 to prevent transverse motion. Slide members 53 and 54 are held in sliding relation to the base by means of fasteners 91 and 92 inserted through slots 81 and 82 and held to the underside of the base by washers 93 and 94.

The printing head 8 consists briefly of a pair of space elongated arms 101 and 102 formed with openings 103 and 104 for receiving shaft 106 for pivotal movement thereon. The arms are held in spaced apart rigid relation by cross beams 107 and 108.

The frame for bearing the screen 9 consists of frame members 110, 111, 112 and 113 having dove-tailed portions 115 and 116. The screen is held to the cross-members 107 and 108 by means of a registrating dove-tail section 117 attached to cross-member 108 and by means of an adjustable clamp 118 having a registrated dove-tail section 119 and a clamping screw handle 121. The screen frame rests firmly against the printing head and thus is as rigid as the arms and cross members of the printing head. A second clamp means 122 with an adjustable knob 123 holds the screen securely in place.

Another feature of the present invention is the use of continuous loop means for driving the squeegee. The loop means 11 consists of a link chain mounted on idler sprockets 125 and 126 mounted for rotation on stub shafts 127 and 128 connected to arm 101. A second link chain 131 is driven by sprocket 132 mounted for rotation on shaft 133. The other end of the link chain is mounted on a sprocket 134 mounted for rotation on stub shaft 128. An identical continuous loop means is mounted on arm 102; parts of which may be seen in FIGURES 2, 9 and 10 as sprocket 136 mounted on shaft 133, link chain 137 mounted between sprocket 136 and 138, idler chain 139 mounted on sprocket 140.

Still a further feature of the present invention is the accurate fidelity with which the printer prints successive parts. The essential elements here consist of a carriage means mounted for reciprocation along arms 101 and 102, a continuous loop means mounted on the arms for travel along spaced first and second tracks, power means adapted for driving the looped means, squeegee means mounted for reciprocation having a first position in contact with the screen and a second position free of the screen and mounted for travel with the carriage, flood bar means mounted for reciprocation having a first position adapted for spreading printing fluid on the screen and a second position free of the fluid and mounted for travel with the carriage, and translating means having a member connected to and traveling with the loop means for lowering the flood bar in the first position and raising the squeegee means above the screen in the second position when the member is traveling along the first track and for reversing the respective positions of the squeegee and the flood means when traveling along the second track.

The carriage means here consists of a base 146 having openings for receiving stub shafts 147 and 148 with rollers 149 and 150 mounted thereon for rolling receipt in channel groove 152 formed in arm 101. Another feature is the ability to adjust the squeegee to varying angles with the screen. A block 153 is formed with an opening for receiving a pin 154 attached to base 146 for pivotally mounting the block. At the other end of the block an elongated slot 156 is formed therein to receive a hold down screw 155 mounted on base 146. Block 153 is formed with a bore 157 for receiving an upright guide member 158. A reciprocating block member 161 is formed with a smooth bore therethrough for slidably receiving upright guide 158 for reciprocation thereon. A cross bar 162 is pivotally attached to the block member at one end by pivot pin 163. The cross bar is formed with a vertically aligned slot 160 for receiving therethrough a threaded pin member 164. Pin 164 also extends through an opening formed in a squeegee backing plate 166. The cross member and the backing plate are held firmly together by a squeegee assembly locking knob 167 connected to the end of pin 164 and formed with an enlarged shank portion 168 for bearing against backing plate 166. The other end of pin 164 is threadably received in a threaded bore formed in a nut 169. Thus, turning knob 167 causes pin 164 to move into nut 169 and thus draw the enlarged shank 168 against backing plate 166 and butt nut 169 against cross member 162 thereby holding the two members in frictional engagement. Squeegee 171 which is normally made from an elastic plastic or rubber is held in horizonal alignment against spacer bar 175 and clamped against backing member 166 by clamp member 172. Clamp member 172 is joined to squeegee backing plate 166 by fasteners 173 and 174. A fine adjustment of the squeegee pressure upon the screen is made possible by providing a squeegee pressure adjustment knob 176 having a shank 177 with a threaded portion 178 which is received in a threaded bore formed in nut 169. The end of shank 177 is connected to member 179 for free rotation therein. Member 179 is connected to cross bar 162 by welding fasteners or other means. Thus in order to increase the pressure of squeegee 171 upon the screen 9, locking knob 167 is loosened and the backing plate 166 is free to move vertically. The vertical adjustment is made by turning squeegee pressure adjustment knob 176 so that nut 169 moves vertically on the threaded portion 178 of shank 177 thus carrying pin 164. When the desired elevation is obtained, locking knob 167 is rotated to clamp plate 166 firmly in relation to cross member 162.

Figure 7:
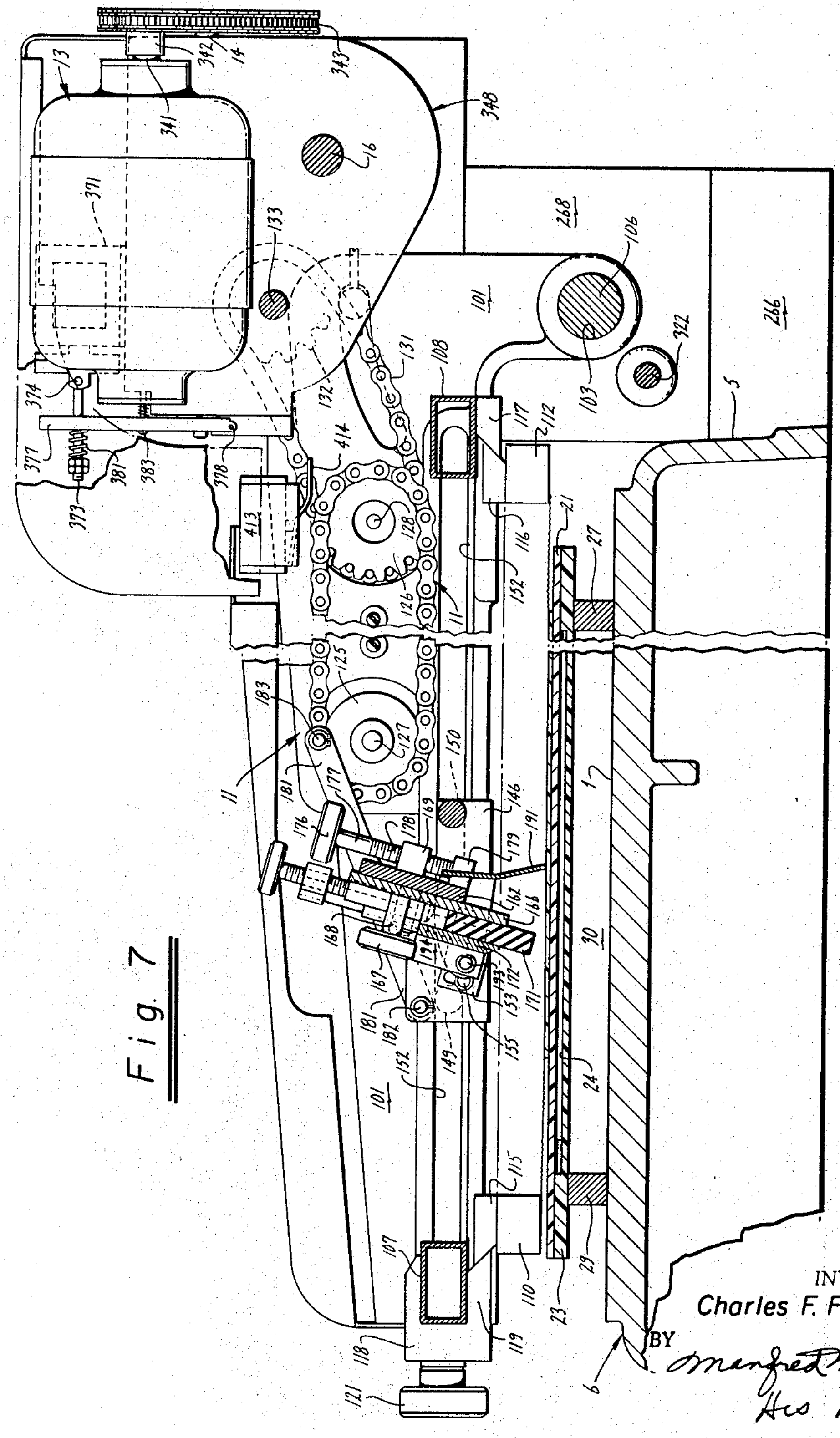
FIGURE 7 is a partial cross-section of the device taken substantially along the line 7—7 of FIGURE 2.
Figure 8:
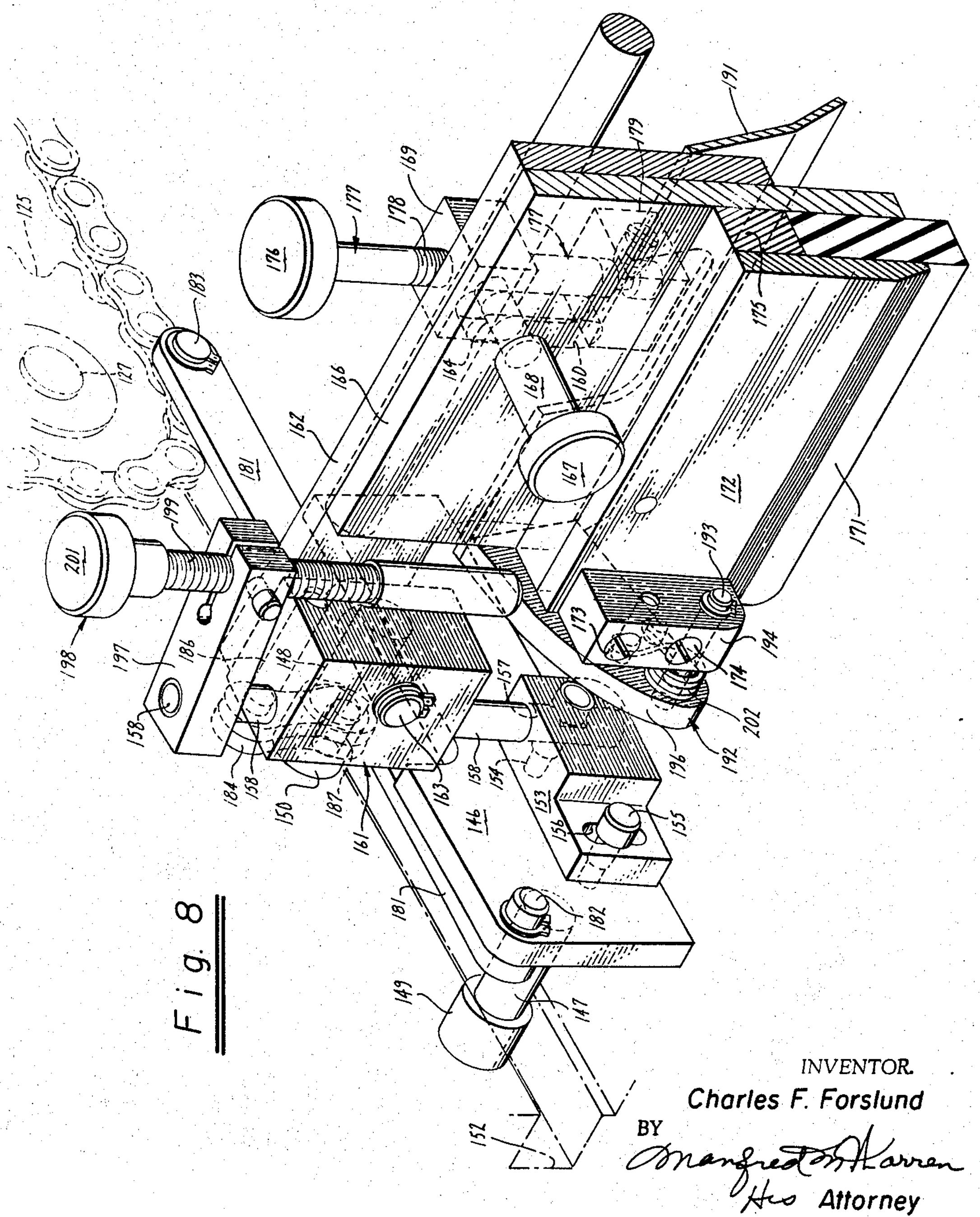
FIGURE 8 is a schematic view on an enlarged scale of a portion of the device.

The translating means for moving the carriage back and forth and for raising and lowering the squeegee consists of a lever member 181 pivotally connected to carriage member 146 by means of pivot pin 182 (see FIGURES 7 and 8). The arm is pivotally connected at the other end to the link chain 11 by pivot pin 183. The lever is connected to crank arm 184 by pivot pin 187 and reciprocating block member 161 is connected to the crank arm by pivot pin 186.

The flood bar means consists briefly of a flat member 191 mounted on a lever arm 192 pivotally connected by pin 193 to a block 194 connected to clamp 172. Lever 192 is formed with a camming face 196.

The assembly for lowering the flood bar consists of an arm 197 connected to the upper end of the guide member 158, the arm being formed with a threaded bore for receiving a knock down pin 198 having a threaded portion 199 threadably received in the bore opening. The pin is provided with an adjusting knob 201 at its upper end. The flood bar is moved to its raised position by spring means 202 connecting block 194 and lever 192. As the cross bar squeegee assembly is elevated by the articulation of link member 181 the mid-point of flood bar lever 192 is raised against the bottom of pin 198 thereby depressing the flood bar to its lowered position on the screen. Contrarywise, upon lowering of the cross bar squeegee assembly to the printing position of the squeegee, flood bar lever 192 is permitted to rise under the action of spring 202 thus elevating the flood bar from the screen.

Figure 2:
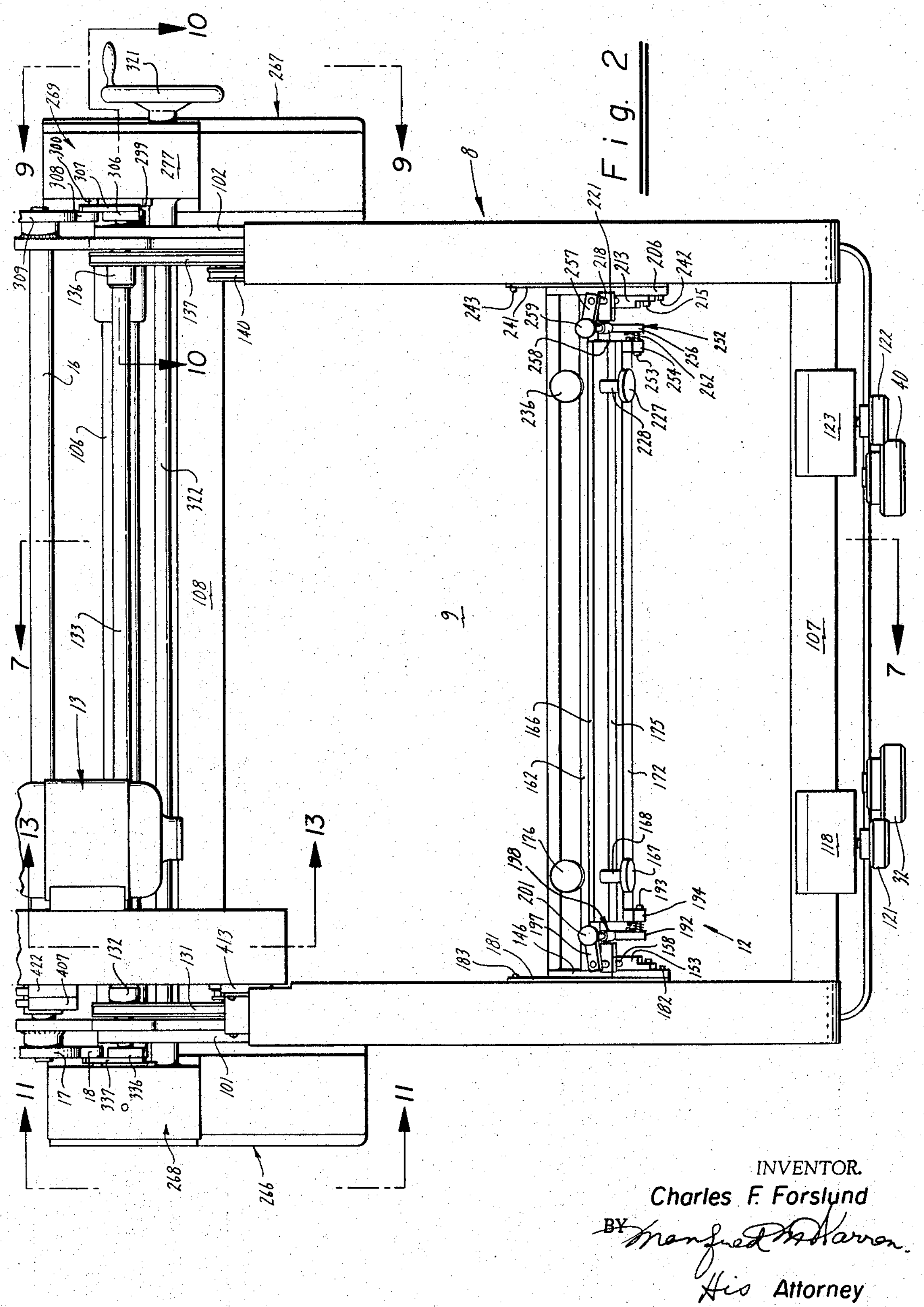
FIGURE 2 is a plan view of the printer shown in FIGURE 1.

The carriage means, squeegee means, adjusting means for the squeegee and flood bar and the translating means are duplicated on the other end of the squeegee means; being identical as the parts shown in FIGURE 8, except reversed. Some of the parts are shown in FIGURE 2 and are numbered for clarity. Base 206 is mounted on rollers (not shown) for reciprocation on arm 102. Block 213 is mounted on the base by a pin (not shown) and by adjusting pin 215. Guide member 218 is mounted on block 213 in an upright position. Reciprocating block member 221 is formed with a bore for receipt of the guide member for sliding reciprocation thereon. Cross bar 162 is attached to base 206. Locking knob 227 is formed with shank portion 228 for engaging backing plate 166. An adjusting knob 236 is formed and positioned for adjusting the pressure of the squeegee on the screen at its right end. The carriage means at the right side of the squeegee bar is connected to the link chain 140 by a lever 241 pivotally connected at the block member by pin 242 and to the chain by pivot pin 243.

A flood attachment coats the screen prior to the printing stroke for even, heavy deposit of resist or ink. The connection of the flood bar at the right side of the squeegee consists of a lever 252 connected to the squeegee at block 254 by pivot pin 253. Lever 252 carries a camming face 256 upon which a knock down pin 258 attached to an arm 257 is connected. Adjustment of the height of the flood bar above the screen is made by adjusting knob 259 attached to the knock down pin. The flood bar is held in the up position by spring means 262 attached to block member 254 and lever 252.

Figure 1:
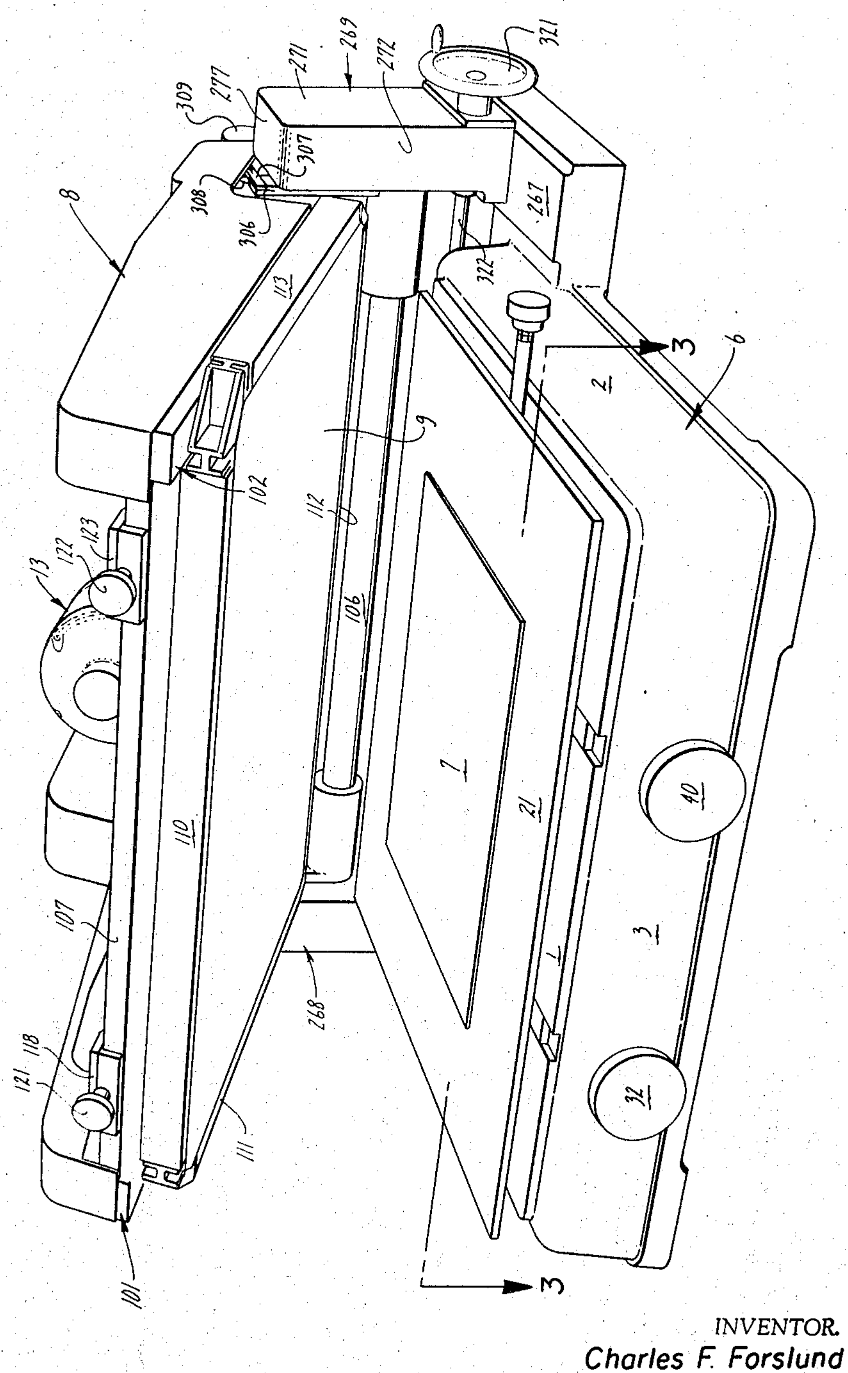
FIGURE 1 is a perspective view of the printer constructed in accordance with the present invention.
Figures 9, 10:
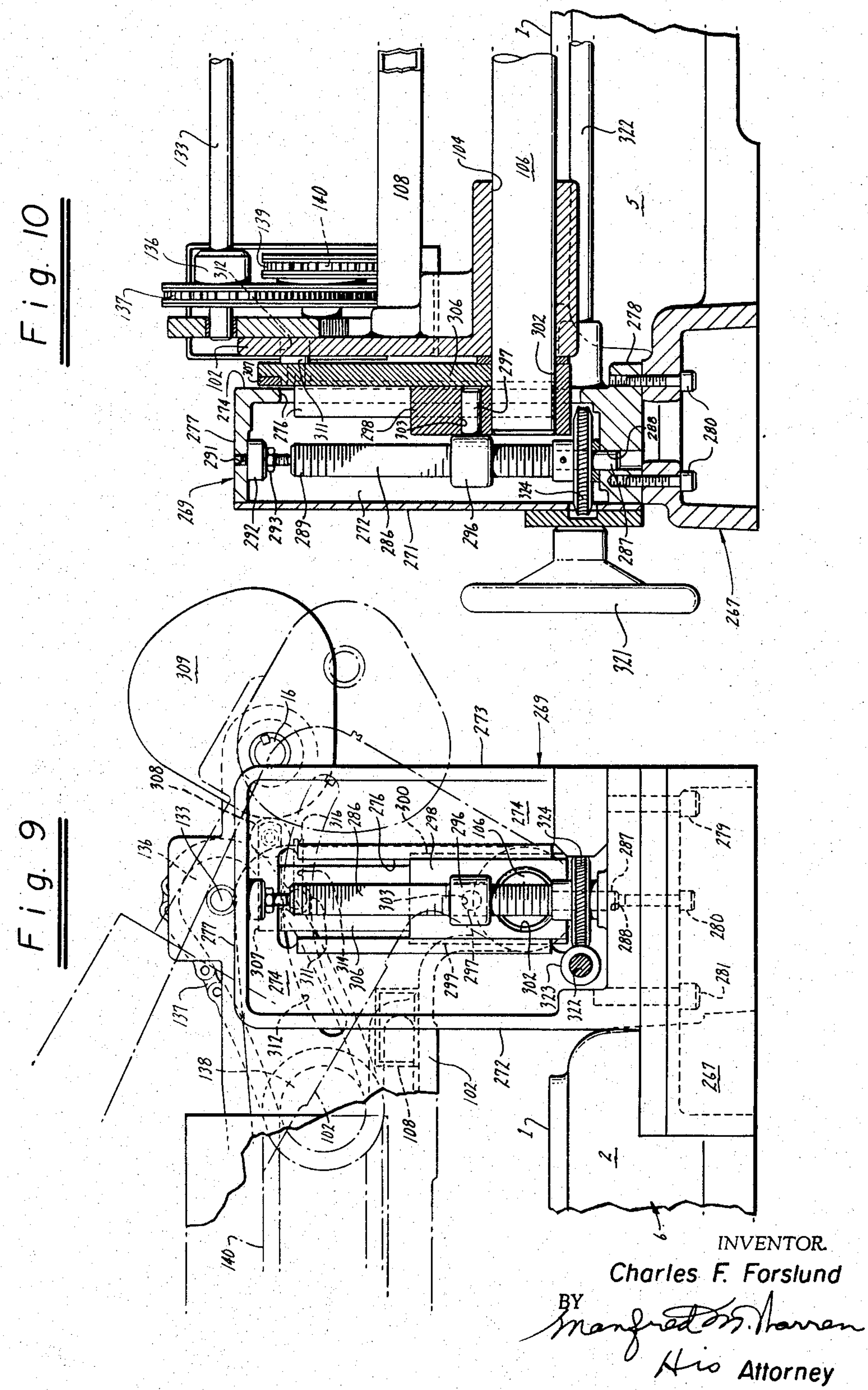
FIGURE 9 is an end elevation of the device with portions removed for purposes of clarity and shown on an enlarged scale.
FIGURE 10 is a partial cross-section of the device taken substantially along the line 10—10 of FIGURE 2 and shown on an enlarged scale.
Figure 12:
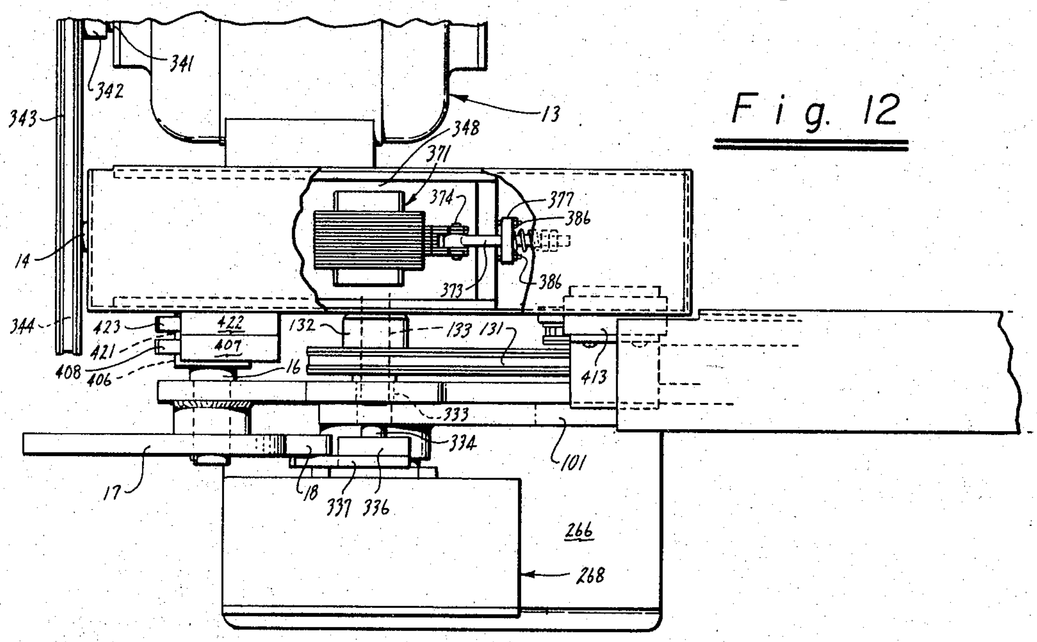
FIGURE 12 is a partial plan view of a portion of the device taken substantially along the line 12—12 of FIGURE 11 with portions broken away for purposes of clarity.

Another feature of the present invention is the ability to adjust the printing head at varying distances to and above the sub-base by a single control. Vertical adjustments of 2 inches or more may be obtained. The structural elements necessary to accomplish the foregoing include a pair of ear bases 266 and 267 upon which is mounted a pair of upriser members 268 and 269. The right hand riser as shown in FIGURES 1, 9 and 10 consists of a side wall 271, front wall 272, a back wall 273 and an inner wall 274 formed with an elongated slot 276 therein, and a top wall 277. A base journal block 278 is attached to the ear base by fasteners 279, 280 and 281. An upstanding threaded member 286 is journaled for rotation with its lower end 287 mounted in bore 288 formed in base 278. The upper end 289 of threaded member 286 is journaled for rotation in bore 291 formed in upper wall 277. End 289 is threaded and mounted thereon is a stop nut 292 and a lock nut 293. Nut 296 is mounted for travel on member 286 and is formed with a pin 297 connected to journal means.

The journal means consists of a T-shaped member 298 having a portion formed for sliding fit in slot 276 and having lugs 299 and 300 formed thereon to prevent transverse movement through the slot. Member 298 is formed with a smooth walled bore 302 formed for receiving an end of shaft 106, and a bore 303 for receiving pin 297. Member 298 is formed with an upright member 306 which carries an arm 307 upon which a cam follower 308 is mounted for free rotation.

Arms 101 and 102 are brought to a substantially parallel position with the base by a stop member 311 mounted at the upper end of upright member 306. The stop member is dimensioned to protrude through arcuate slot 312 formed in arm 102.

Precise adjustable alignment of the arms 102 and 101 in parallel relation to the base is obtained by varying the effective length of the elongated arcuate slot 312. A threaded bore 314 is formed in an end of arm 102 opening to slot 312. A threaded screw 316 is dimensioned for threadable receipt in bore 314 and protrudes into the opening formed by slot 312 and engages stop member 311 when the arm is substantially parallel to the base.

Movement of the entire printing head assembly is effected by rotating hand wheel 321 connected for rotation on shaft 322, formed with a worm gear 323. Gear 324 is formed to mesh with gear 323 and is mounted for rotation on upright threaded member 286. Thus turning of hand wheel 321 rotates upright member 286 which causes nut member 296 to move in a vertical direction which in turn moves the entire printing head assembly in a vertical direction.

The journal means mounted on the left side of the machine as seen in FIGURE 2 and enclosed in riser 268 is similar to the journal means mounted on the right side and enclosed in riser 268. Some of the essential parts may be seen by referring to FIGURE 11. Arm 101 is formed with an arcuate slot 332 formed for receiving a stop member 333 mounted on stub shaft 334. Upright member 336 supports arm 337 upon which cam follower 18 is mounted for engagement with cam 17.

The drive mechanism for operating the link chain for driving the squeegee consists of a motor 13, a motor shaft 341 driving a pulley 342 which drives a flexible belt 343 and in turn drives a pulley wheel 344 mounted for rotation on driven shaft 14. A worm gear 346 is mounted for rotation on shaft 14 and drives gear 347 mounted on shaft 16. Shaft 14 is mounted in housing 348 carried by the printing head. Sleeve bearings 351 and 352 are mounted in housing 348 for carrying shaft 14.

The clutch mechanism is here carried by end 356 of shaft 14 on which is mounted sleeve bearings 362 and 363 carrying a worm gear 357 formed for engagement with gear 358. Worm gear 357 is formed with a sleeve extension member 359, formed with a flange 361 providing a clutch face. Clutch 366 is mounted for axial movement on end 356 and is formed with a clutch face for movement into and engagement with a washer 367 which engages the clutch face on flange 361. The clutch is moved axially by thrust bearing 368 and mounted for rotation on shaft 14 by pin 369.

The clutch is electrically operated by a solenoid 371 which is connected by a solenoid arm 372 pivotally connected to arm 373 at pivot pin 374 inserted through an opening 376 in lever arm 377. The lever arm is pivotally connected at its other end by pin 378 mounted for rotation on housing 348. Spring 381 is mounted on arm 373 to absorb the shock when the solenoid moves the lever to a clutch engaged position. Spring 382 mounted on shaft 383 slideably mounted through opening 384 in lever 377 biases the lever to a clutch disengaged position. Thrust pin 386 is threadably mounted on lever 377 for engagement with thrust bearing 368 and carries a lock nut 387 for locking adjustment of the clutch. Shaft 16 is journaled on housing 348 in bearing 388 and 389. Shaft 133 is journaled in the housing by sleeve bearing 391 and 392.

The electro-mechanical control means for causing the printer to move through one complete cycle consists briefly of an energizing circuit 404 including a normally open first microswitch 407 having a lever 408 mounted for closing for a defined period of time by a control cam 406 mounted on shaft 16 for initially energizing the solenoid 371 so as to engage the clutch for moving the squeegee through the return stroke; the circuit includes a relay coil 411 and a relay switch 412 for maintaining the solenoid in an energized state immediately following the reopening of the first switch; the circuit includes a second normally closed switch 413 having a lever 414 pivotally mounted and positioned so as to contact arm 183 on the continuous loop and to open the circuit by de-energizing the relay coil 411, opening the relay switch 412 and thereby de-energizing the solenoid and stopping the continuous loop means by disengaging the clutch when the squeegee has completed the print stroke; and the control cam 406 being formed and positioned on shaft 16 so as to change the solenoid circuit to a de-energized state thereby holding the clutch disengaged and preventing movement of the loop means for period of time after the completion of the print stroke to permit raising and lowering of the head to permit changing of the part printed before beginning a successive printing stroke.

It is desirable to give the operator control over the cycling of the printer and for this purpose a foot switch 416 is provided in the circuit in series with a relay coil 417 which is energized when the foot switch is closed. Relay coil 417 closes relay switch 418 which keeps the circuit closed after the foot switch is opened. A second control cam 421 mounted for rotation on shaft 16 is positioned to open a microswitch 422 by tripping a lever 423 pivotally connected to the microswitch thus de-energizing circuit 404 and stopping the machine operation. Single cycle foot switch operation permits approximately 860 impressions or more per hour.

A pilot light here shown as a neon bulb 426 is provided to indicate when the master switch 427 is closed.

In order to protect the circuit a thyrector 428 is provided in the circuit parallel and a fuse 428 in series. The power unit here shown is a ⅛ horsepower motor.

Figure 15:
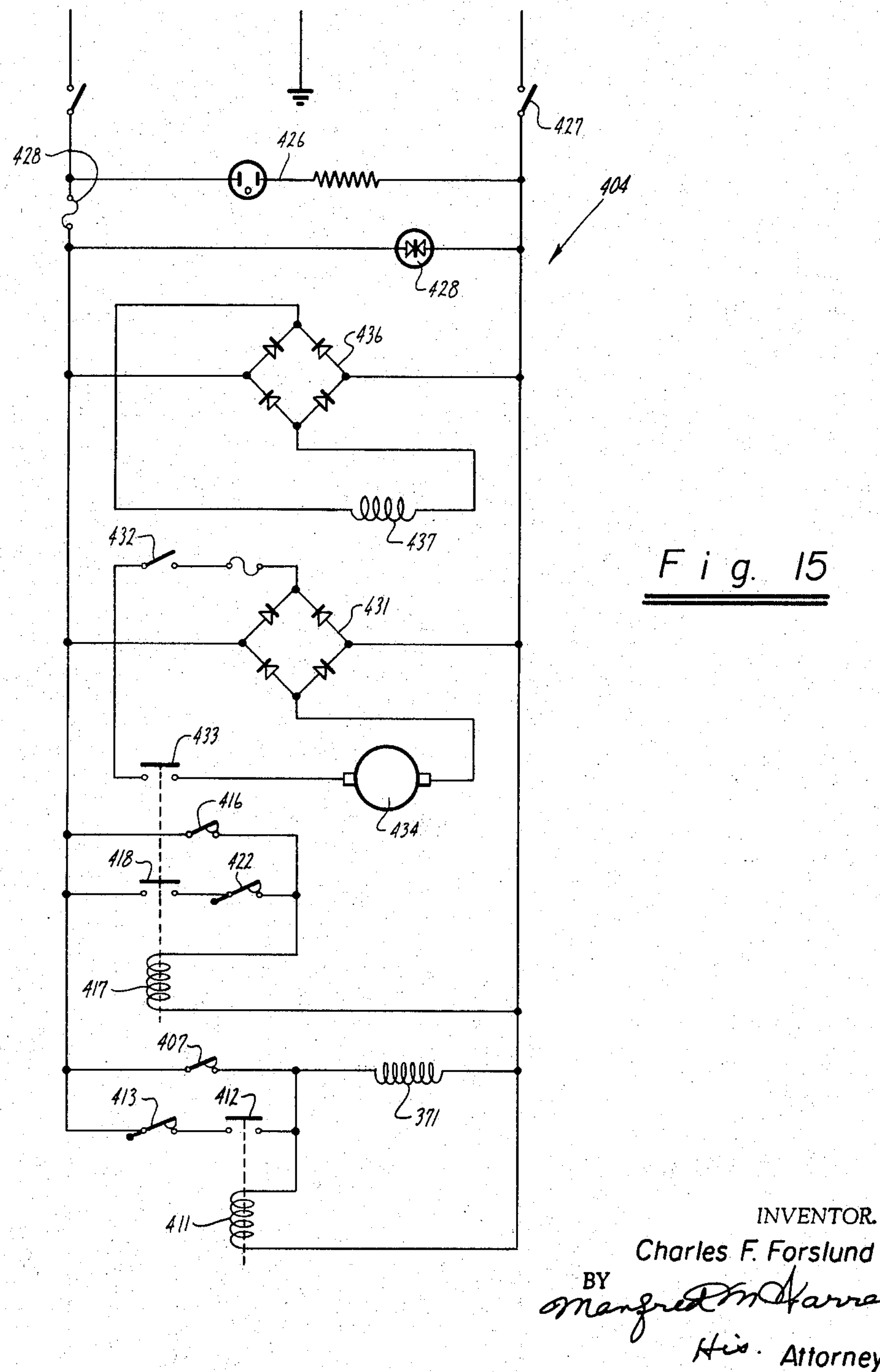
FIGURE 15 is a schematic electrical diagram for the present device.

A schematic of the motor electrical circuit is shown in FIGURE 15 and here includes a rectifier 431, a control switch 432 and a relay switch 433 energized by relay coil 417 in series with the armature 434. A second rectifier 436 is connected to the motor field 437.

In operation, the first step is to attach the mounting lug 117 to cross-bar 108. The stencil is then positioned on the screen and the screen frame attached to the printing head by dove-tailing clamps 118 and 122 into the matching sections of the screen frame.

The next step is to attach a holding fixture or registering device (not shown) to the adjustable base 21 in relation to the position of the stencil on the screen.

The next step is to register the screen to the part which consists of the steps of turning knobs 32, 40 and 68 which move the sub-base 21. Turning knob 32, for example, rotates shaft 33 and threaded part 37, which in turn moves threaded nut 88 along the threaded portion. Nut 51 is connected to a slide member 53 by fastener 56 which is slidably held in groove 58. A pin 61 mounted on the slide connects with a block member 66 which is connected to an elongated rod 73 connected to frame members 30 and 28 of the sub-base assembly. Control knob 40 is similarly connected to block 67 which is also connected to elongated member 73. Movement along the $y$-axis is obtained by turning knob 68 mounted for rotation in side frame 28 and threadably connected to a threaded bore in block 67. Thus when the knob 68 is turned the entire sub-frame assembly moves along the $y$-axis parallel to elongated member 73. Rotation of the sub-base may also be effected by turning the control knobs as more completely explained above.

After the screen is in registration with the part to be printed the head is set for off contact printing by rotating hand wheel 321. Rotation of the wheel rotates shaft 322, which turns worm 323 which in turn moves gear 324 connected for rotation of threaded member 286. Nut 296, threadably connected to member 286 is connected to journal means 298 and moves vertically on threaded shaft 286. Shaft 106 is pivotally connected to the journal means and arms 101 and 102 are journaled on shaft 106. Thus movement of wheel 321 causes the entire printing head assembly which rests on arms 101 and 102 to pivot.

The next operation is to set the squeegee pressure which consists of unlocking the squeegee backing plate 166 from the cross member 162 so that the squeegee can move vertically in relation thereto. This is accomplished by rotating knobs 167 and 227 and then rotating adjusting knobs 176 and 236 until the squeegee is at the correct pressure on the screen. Locking knobs 167 and 227 are then tightened to hold the squeegee in the proper relation to the cross member 162. The flood bar 191 is then adjusted so that it comes in contact or just out of contact with the screen by rotating knobs 201 and 259 which cause levers 192 and 252 to rotate on pins 193 and 253 against the biasing force of springs 202 and 262.

The squeegee assembly reciprocates back and forth along arms 101 and 102 in a channel 152 on sets of rollers attached to the sub-base 146 and 206. As previously mentioned, a major feature of the present invention is the fact that the squeegee is held in the identical angle to the printing screen for each printing stroke. The squeegee reciprocates on guides 158 and 218 which are held in position by blocks 153 and 213. The angle of the squeegee to the screen may be varied by pivoting the guides 158 and 218 by merely loosening screws 155 and 215 and pivoting blocks 153 and 213 about pivot pins 154 and a pin connected to block 213 but not shown.

Referring to FIGURES 7 and 8, squeegee means 12 is connected to link chain means 11 by a pivot arm 183 which moves in a counterclockwise direction. As shown in FIGURE 7, the flood bar 191 is in the flooding position and the squeegee is in the raised position when lever arm 181 is in the position shown. Further movement of pin arm 183 in a counterclockwise direction causes lever 181 to pivot about point 182 into a more nearly horizontal position thus causing crank arm 184 to move block 161 to a lower position and carrying cross member 162, back bar 166 and squeegee 171 downwardly with squeegee 171 coming into contact with screen 9. Since sub-base 146 moves parallel to arms 101 and 102 at all times and guide members 158 and 218 are connected thereto and always at the same angle, squeegee 171 is always lowered to the same angle in relation with the screen in every printing stroke regardless of squeegee wear.

This unique arrangement of the squeegee means in relation to the driving means permits machines of greater printing stroke to be easily constructed using the same basic principles. Thus by merely lengthening the chain 11 and locating the sprockets 125 and 134 further apart on longer printing head arms machines can be designed to accommodate larger screens.

The electrical operation of the printer is effected by closing the control switches, and closing the foot switch 416 activates relay coil 417 which in turn closes relay switches 418 and 433. Closing of switch 433 energizes the motor 13 causing shaft 14 to rotate and turns shaft 16 through worm gear 346 and gear 347. Cams 17 and 309, keyed to shaft 16, rotate and move against cam followers 18 and 308, causing arms 101 and 102 to pivot about shaft 16 and move away from the sub-base 21. Switch 422 is biased to a closed position and the motor continues to operate after the foot switch 416 has been released since relay coil 417 remains energized and relay switches 418 and 433 remain in the closed position. Control cam 406 is mounted on shaft 16 for rotation and trips lever 408 thus energizing switch 407 which in turn energizes relay coil 411 which closes switch 412 and the flow of current energizes solenoid 317. When the solenoid is energized the clutch means is engaged and worm gear 357 rotates with shaft 14 thus turning gear 358 and rotating shaft 133 which causes link chain 131 to run, shaft 128 with sprocket 126 is rotated and link chain 11 is thereby rotated which moves the squeegee means 12 as above described. Once relay switch 412 is energized, the solenoid remains energized and the clutch remains engaged since switch 413 is in a normally closed position. Thus, the squeegee continues to move with chain 11 until the clutch is disengaged by the solenoid. The pivoting of the arms 101 and 102 and the movement of the squeegee means 12 is timed so that the flood bar will flood the screen 9 while the arms are being lowered to operating position. Once the arms are lowered, the translating means operable by lever 181 automatically raises the flood bar and lowers the squeegee as above described. The squeegee continued its printing stroke moving from left to right as shown in FIGURE 7. A micro-switch 413 is located so that when the end of the printing stroke is reached, pin arm 183 will move lever 414 of the micro-switch and break the circuit so that relay coil 411 will be de-energized thus de-energizing the solenoid 317 and spring 382 will move lever 377 so that the clutch will become disengaged. Movement of the squeegee will stop while the motor continues to raise the arms 101 and 102 out of position with the sub-base so that a new part can be placed thereon for printing. When the arms are in the highest raised position, a control cam 412 is positioned so that it will strike lever 423 on micro-switch 422 thus breaking the circuit and de energizing relay coil 417 and opening relay switch 418 and 433. This causes the motor to stop operation and the printing is set for the next cycle.

I claim:

1. A printing device comprising:

a base adapted for receiving a part to be printed;

a printing head adapted for receiving a screen and pivotally mounted on said base for movement between an operative printing position in registration with said base and an inporative position removed from said base;

continuous loop means mounted on said head having spaced first and second tracks and carrying a switch actuating arm;

squeegee means mounted on said head for movement across said head and being connected to said loop means for controlled repetitive printing strokes and return strokes;

motor means;

a drive shaft connected to said motor;

a driven shaft mounted for rotation on said head and connected to said drive shaft;

a cam mounted on said driven shaft for rotation therewith;

a cam follower mounted on said base and positioned so as to react with said cam for moving said head to operative position during said squeegee printing stroke and to inoperative positions during said return stroke;

gear means selectably connecting said drive shaft and said continuous loop means for driving said squeegee;

clutch means movable between an engaged position for making the connection between said drive shaft and said gear means and a disengaged position breaking the connection therebetween;

solenoid means operably connected to said clutch means and including a spring biasing said clutch to a disengaged position;

a control cam mounted for rotation on said driven shaft;

an energizing circuit for said solenoid and including a normally open first switch mounted for closing for a defined period of time by said control cam for initially energizing said solenoid so as to engage said clutch for moving said squeegee through said return stroke;

said circuit including a relay coil and a relay switch for maintaining said solenoid in an energized state immediately following the re-opening of said first switch;

said circuit including a second normally closed switch positioned so as to contact said arm on said continuous loop and to open said circuit by de-energizing said relay coil, opening said relay switch and thereby de-energizing said solenoid and stopping said continuous loop means by disengaging said clutch when said squeegee has completed said print stroke; and said control cam positioned so as to hold said solenoid circuit in a de-energized state thereby holding said clutch disengaged and preventing movement of said loop for a period of time after the completion of said print stroke to permit raising and lowering of said head to permit changing of said part printed before beginning a successive printing stroke.

2. A screen printing apparatus comprising:

a printing head;

means carried by said head for clamping a printing screen thereto;

a squeegee carriage mounted on said head for reciprocation across said screen;

a squeegee carried by said carriage and movable relative thereto to an advanced position in engagement with said screen for traversing said screen in a printing stroke and being movable relative to said carriage to a retracted position removed from said screen during the return stroke;

a continuous loop drive for said carriage carried by said head and positioned in a plane perpendicular to said screen and parallel to the direction of reciprocation of said carriage;

a member connecting said loop drive and carriage for displacement of said squeegee through said printing and return strokes upon full circuit travel of said loop drive;

means connecting said squeegee to said member for displacement thereby to said advanced position during said printing stroke and to said retracted position during said return stroke;

a base adapted for receiving a part to be printed;

means mounting said head on said base for reciprocating movement of said head to and between a printing position juxtaposed to said base and a non-printing position spaced therefrom;

a motor;

drive means connected to said motor for displacing said head to and between its printing and non-printing positions;

a clutch connecting said motor to said loop drive for opening and closing of driving connection thereto;

means actuated by said drive means for closing said clutch; and means actuated by said loop drive for opening said clutch.

References Cited

UNITED STATES PATENTS

| | | | |
|---|---|---|---|
| 2,162,440 | 6/1939 | Masson | 101—123 |
| 2,267,596 | 12/1941 | Montague et al. | 101—123 |
| 2,730,043 | 1/1956 | Louft | 101—123 |
| 2,751,842 | 6/1956 | McLaurin | 101—123 |
| 2,845,858 | 8/1958 | Denley | 101—123 |
| 3,109,365 | 11/1963 | Karlyn | 101—124 |
| 3,263,603 | 8/1966 | Fuchs | 101—123 |

ROBERT E. PULFREY, *Primary Examiner.*

H. P. EWELL, *Assistant Examiner.*